United States Patent [19]

Hatanaka et al.

[11] Patent Number: 5,615,304
[45] Date of Patent: Mar. 25, 1997

[54] JUDGEMENT SUPPORT SYSTEM AND METHOD

[75] Inventors: Shyoko Hatanaka, Funabashi; Chizuko Yasunobu, Tokyo; Michitaka Kosaka, Sagamihara, all of Japan

[73] Assignee: Hitachi, Ltd., Tokyo, Japan

[21] Appl. No.: 114,312

[22] Filed: Aug. 30, 1993

[30] Foreign Application Priority Data

Sep. 8, 1992 [JP] Japan .................................. 4-239344

[51] Int. Cl.⁶ .................................................. G06F 17/20
[52] U.S. Cl. .............................. 395/12; 395/51; 395/76
[58] Field of Search .............................. 395/10–11, 13, 395/50–54, 76–77, 12, 925

[56] References Cited

U.S. PATENT DOCUMENTS

| | | | |
|---|---|---|---|
| 5,175,797 | 12/1992 | Funabashi et al. | 395/22 |
| 5,182,793 | 1/1993 | Alexander et al. | 395/13 |
| 5,214,269 | 5/1993 | Yamashita et al. | 235/379 |
| 5,262,941 | 11/1993 | Saladin et al. | 364/408 |
| 5,313,560 | 5/1994 | Maruoka et al. | 395/54 |
| 5,406,477 | 4/1995 | Harhen | 364/401 |
| 5,471,560 | 11/1995 | Allard et al. | 395/77 |

OTHER PUBLICATIONS

Cortes–Rello et al, "Management of Uncertainty of Intelligent Financial Systems"; The First International Conference on Artificial Intelligence on Wall Street, pp. 238–243, 9–11 Oct. 1991.

Hong et al, "A knowledge based dss for supporting ill–structured multiple criteria decisions"; 1989 Hawaii international conference on system sciences, pp. 229–240. 1989.

Yoshino, Katsyuki, et al. "Development of Middle Software for Expert System Building," Hitachi Journal, vol. 72, No. 11, (1990–11), U.D.C. (681.32.06:159.95):681.322.071.3.06. (Japanese).

"Financing Judgement Support System," The 12th Software Lecture for IBM by a Foundation of Financial Information System Center (FISC). (Japanese).

*Primary Examiner*—Tariq R. Hafiz
*Attorney, Agent, or Firm*—Fay, Sharpe, Beall, Fagan, Minnich & McKee

[57] ABSTRACT

In a judgement support system and method, essential items to be necessarily judged and optional items to be optionally judged by a user are displayed on a menu screen, thereby allowing a judgement through intuitive knowledge of the user. After judgement results of all essential items have been inputted, the system is allowed to stop its operation. When a judgement result is inputted, an evaluation of the judgement is outputted in accordance with a predetermined rule. The evaluation includes updating a judgement item. For example, an essential judgement item is added. The menu screen is dynamically changed during judgement.

9 Claims, 18 Drawing Sheets

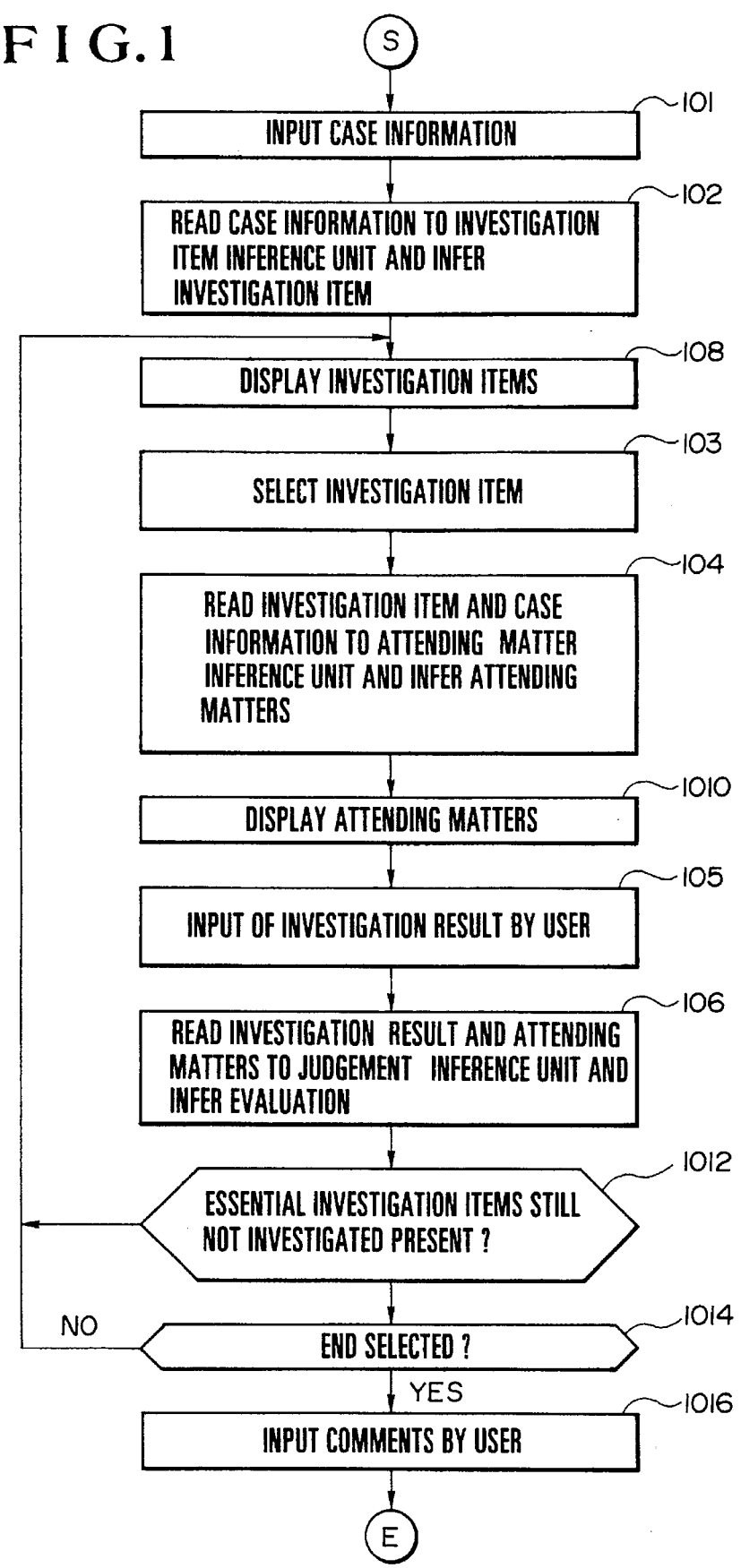

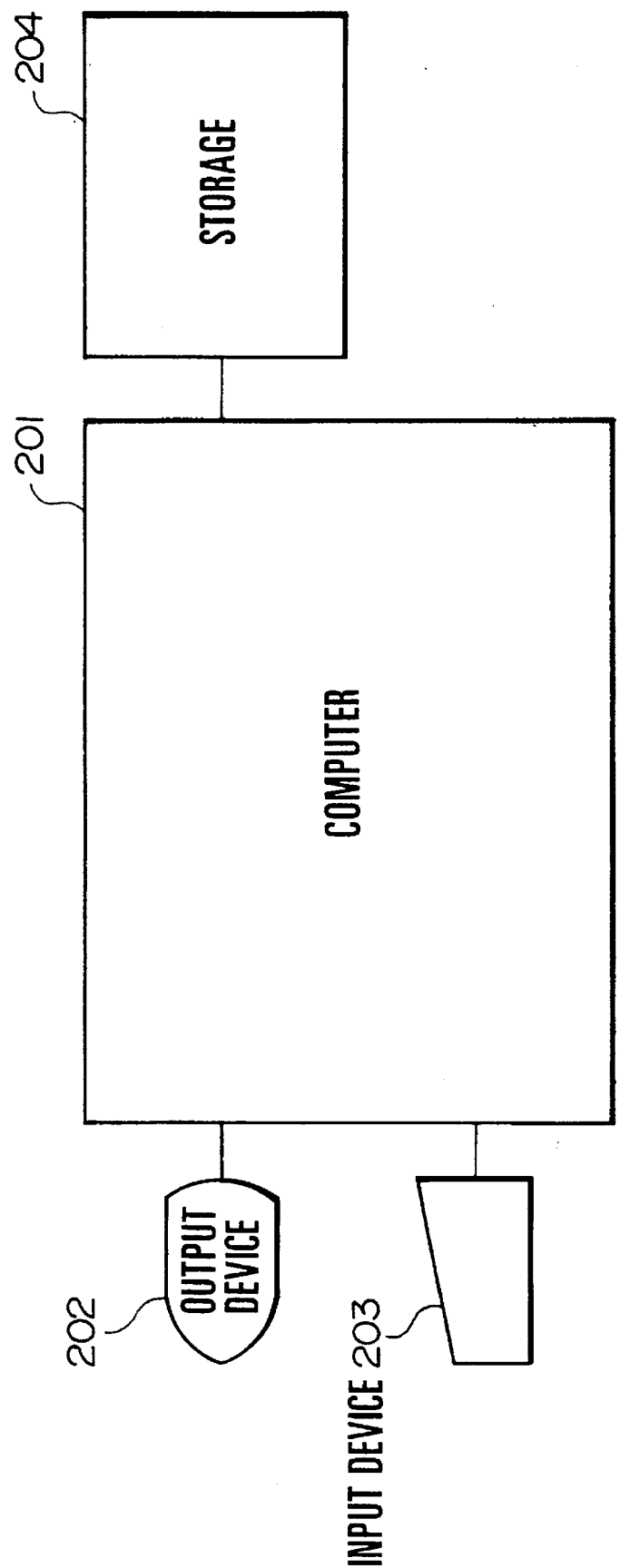

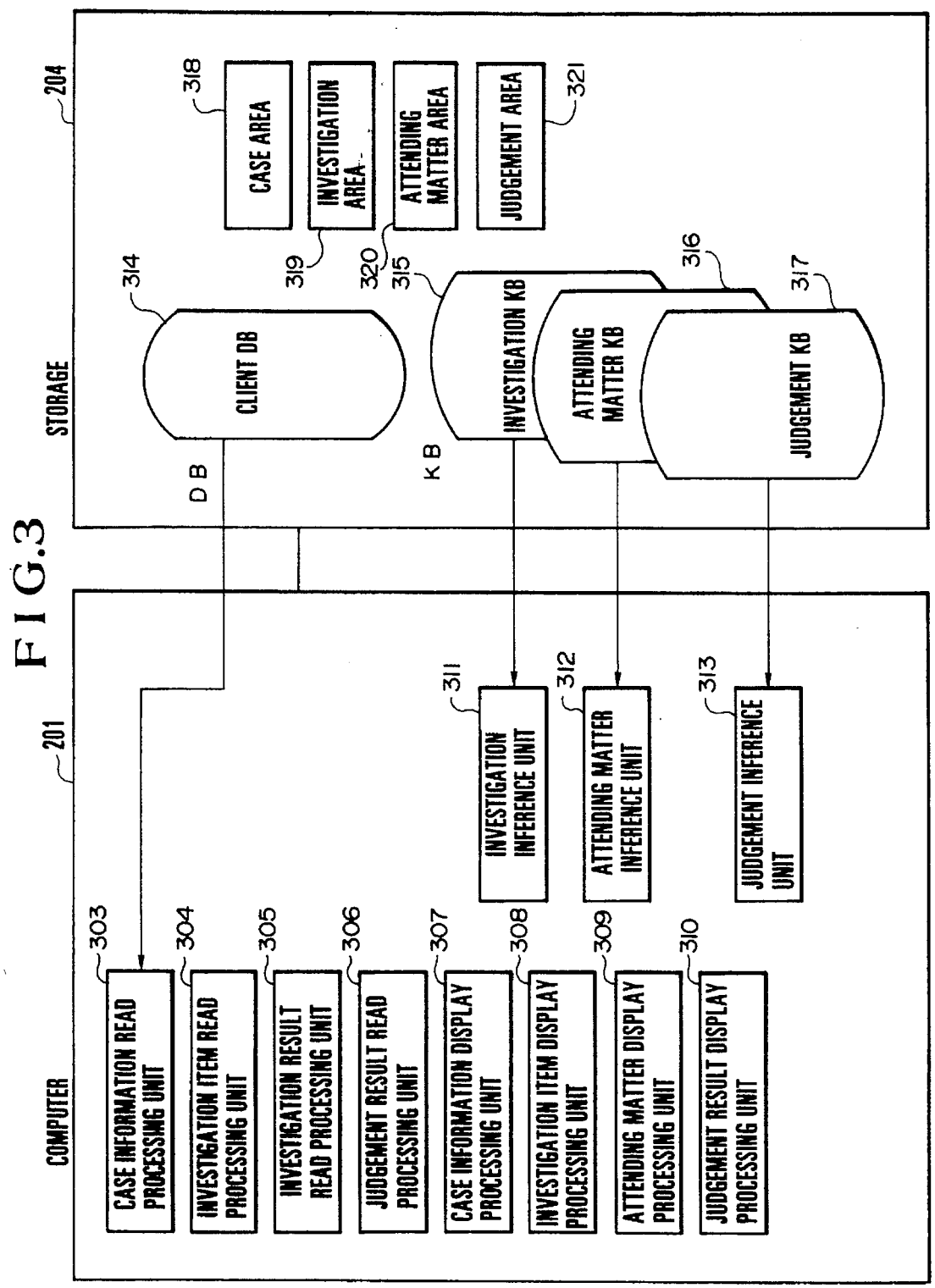

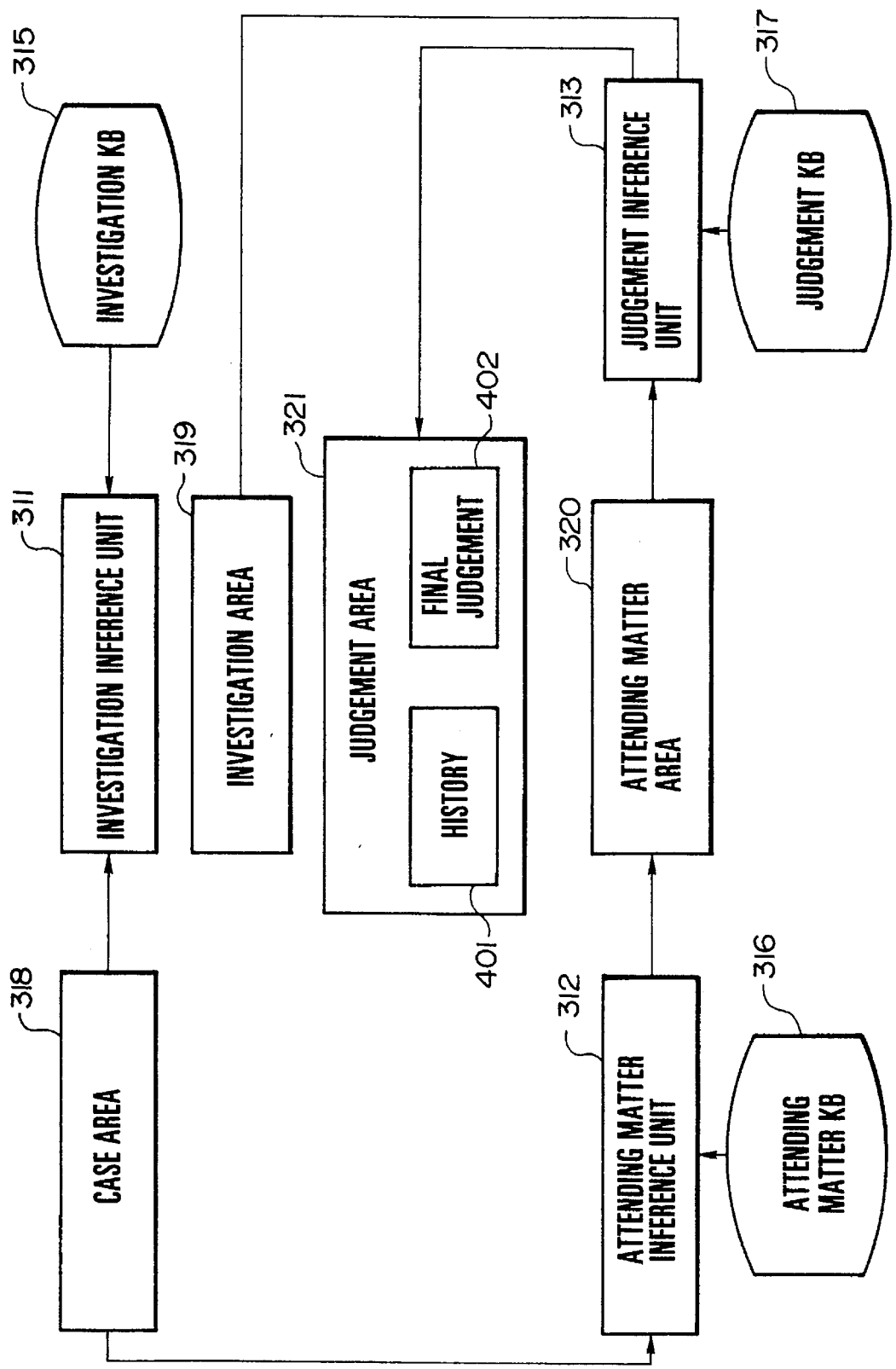

FIG.5

| No | ATTRIBUTE NAME | ATTRIBUTE CONTENT |
|---|---|---|
| 1 | ACCEPTANCE NUMBER | 4126 |
| 2 | CORPORATION NAME | "A" ELECTRIC MACHINE SALES COMPANY |
| 3 | APPLICANT | XX   XX |
| 4 | PERMISSION / APPROVAL NUMBER | NONE |

FIG.6

ESTABLISHED CASE CONTENT AREA

| ATTRIBUTE NAME | ATTRIBUTE CURRENT |
|---|---|
| ACCEPTANCE NUMBER | 4126 |
| CORPORATION NAME | "A" ELECTRIC MACHINE SALES COMPANY |
| APPLICANT | XX   XX |
| ... | ... |

UNSETTLED CASE CONTENT AREA

| ATTRIBUTE NAME | ATTRIBUTE CONTENT |
|---|---|
| PERMISSION / APPROVAL NUMBER | NONE |
| EXPLANATION OF PRESENTED DOCUMENTS | INSUFFICIENT |
| APPLICANT / ACTUAL MANAGER | DIFFERENT |
| ... | ... |

1

JUDGEMENT SUPPORT SYSTEM AND METHOD

BACKGROUND OF THE INVENTION

1. Field of the Invention

The present invention relates to a judgement support system and method suitable for checking credit rating of clients in finance and circulation.

2. Description of the Related Art

A conventional judgement support system guides a user by predetermined rules which have been determined in accordance with the know-how of veteran users. As a judgement support system using rules, there is known a system using an artificial intelligence (AI) tool as described in "Development of Middle Software for Configuring Expert System", Hitachi Journal, Vol.72, No. 11 (1990-11), U.D.C. [681,32.06:159.95]: 681.322.071.3.06. This system uses an AI tool (merchandise name: ES/PROMOTE-DIAG) manufactured by Hitachi, Ltd., assignee of the present invention. An example of this system will be described with reference to FIG. 20. A judgement is inferred by using a knowledge base 2005 which stores rules written in a decision tree structure (Step 2001). During this inference, any inquiry necessary for the judgement is issued (Step 2003). An answer to the inquiry is supplied (step 2004). The final judgement is inferred and displayed (Step 2002).

A decision support system (DSS) is also used for supporting a user to decide a final judgement or evaluation. A DSS using rules for supplying comments is known as described in the article "Financing Judgement Support System", presented at the 12-th Software Lecture for IBM by a Foundation of Financial Information System Center (FISC).

With this system, as shown in FIG. 21, an investigation item menu is displayed (Step 2101). A user selects a desired investigation item (Step 2102). The selected item and case state are read to an inference unit, and an evaluation (comment type) is inferred by using a knowledge base 2105 which stores rules determined by the know-how of veterans (Step 2103). The user decides and inputs a final judgement (comment) (Step 2104). The investigation item menu is again displayed, and if there is another investigation item, the user repeats the above procedure.

A typical judgement practically performed will be described for the case of financing judgement.

Basic data for judgement includes, for example, financial statements presented by a client, supplement accounting books for the basis of the financial statements, ledgers such as of accounts receivable and payable for the basis of the supplement accounting books, and receipts. The user of the system investigates the financial statements, and thereafter investigates the ledgers such as of accounts receivable and payable presented by the client at an interview. If any ambiguity is found, the receipts are checked on site. There are many cases wherein an on-site investigation is made before an interview, an investigation is completed only by financial statements, or financial statements are presented at a later time. Generally, the order, priority, or the like of the investigation is dependent on each investigator.

With the judgement support system using ES/PROMOTE-DIAG explained with FIG. 20, it is necessary to describe rules for the investigation of financial statements, supplement accounting books, ledgers, and receipts. For example, if financial statements are first investigated and there is no ambiguity, then the receipts are investigated, or if there is any ambiguity, the supplemental accounting books are investigated. The user is therefore forced to investigate either the receipts or the supplemental accounting books in accordance with the investigation results of the financial statements, and is not permitted to investigate the financial statements after the receipts. The discretion of a user is limited only to answering a question pre-described in rules.

The system shown in FIG. 20 describes rules in the knowledge base 2005 in the form of a decision tree. Therefore, the following problems occur:

(1) It is not possible to investigate in the manner as a user desires. This system is not suitable for the judgement of the type that a final result is obtained from intuitive knowledge of a user through trial and error.

(2) From the same reason described in (1) above, this system is not suitable for the judgement of the type that determines a need of investigation basing upon data at a user, the location of a user, and the state of the location.

(3) Since a judgement of a user obtained from intuitive knowledge cannot be used only in a limited range, this system is not suitable for the judgement of the type which derives intuitive knowledge of a user from the total knowledge balance.

In the system shown in FIG. 21, although rules are used for judging each investigation, a user can select a desired investigation item from the investigation item list (Step 2101). In addition, a user is required to judge an evaluation (comment) (Step 2104). However, there is provided no guidance for determining an investigation method and judging an obtained evaluation in accordance with the investigation state. The following problems therefore occur:

(1) Unnecessary investigation may be made by a novice user because of no guidance to an investigation method.

(2) From the same reason of (1) above, an investigation item may be selected differently by users.

(3) A judgement may be made differently by users differently without any basis of total judgement criterion.

SUMMARY OF THE INVENTION

It is an object of the present invention to ensure a uniform judgement quality by giving a user some discretion regarding the selection of an investigation item, the order of selecting an investigation item, and details of an investigation method, and by forcing the user to select particular investigation items and particular details of an investigation method determined by predetermined rules.

It is another object of the present invention to use an AI tool and a DSS tool integrally.

It is a further object of the present invention to provide a system capable of displaying an item weight or priority on an item menu relative to which data input or other processing is requested.

The summary of the invention will be described with reference to FIGS. 22 and 23. In FIG. 23, screens (1) to (5) show information displayed on a display of a system. The system may use a general computer system having a display, an input device such as a keyboard and a mouse, a CPU, a storage, and a printer.

When necessary data is inputted while referring to the display contents of a case attribute information input screen (1) (Step 2201), investigation items are selected in accordance with rules stored in an investigation knowledge base (KB) 2208 and a menu screen (2) is displayed (Step 2202). The investigation items include essential investigation items and optional investigation items, both types of items being discriminatively displayed. The former type is indicated by a stripe mark, and the latter type is indicated by broken oblique lines. The essential investigation items are necessarily subject to investigation, and the optional investigation items are subject to the discretion of a user.

As one of the investigation items displayed on the menu screen (2) is selected (Step 2203), an attending matter is displayed on an investigation screen (3) in accordance with rules stored in an attending matter knowledge base 2209. An attending matter is information a user is required to consider during investigation. For example, an attending matter includes a particular investigation subject and details of an investigation method. In addition to the attending matter, basic data such as an accounting book, and an investigation remark are displayed on the investigation screen (3), simultaneously. A user proceeds with investigation by referring to such data.

When an investigation result is entered (Step 2205), an evaluation for a selected investigation item is inferred in accordance with rules stored in a judgement knowledge base 2210 (Step 2206). This evaluation may include a renewal of the investigation item. In the case of a renewal, the investigation item is renewed. If not, the investigation item after the evaluation is given an already investigated representation on the menu screen (2). This representation is classified into three colors in accordance with the evaluation. In this embodiment, green is allocated to the evaluation score of 80 to 100 points (OK), yellow is allocated to the evaluation score of 60 to 79 points, and red is allocated to the evaluation score of 59 points or lower (NG). This coloring is distinctive from the marks representing essential and optional investigation items.

If a "selection end" is selected at Step 2203, it is checked at Step 2212 where there is an essential investigation item still not investigated. If there is an investigation item still not investigated, the menu screen (2) is again displayed. If there is no essential investigation item, the user is allowed to enter a comment on a judgement screen (4) (Step 2214). Thereafter, the investigation procedure is terminated at a screen (5).

In another embodiment, the judgement screen (4) is not displayed until all essential investigation items have been investigated.

BRIEF DESCRIPTION OF THE DRAWINGS

These and other objects and technical advantages of the present invention will become readily apparent from the following description of the preferred exemplary embodiment of the invention when read in conjunction with the accompanying drawings, in which:

FIG. 1 is a flow chart showing the operation of a judgement support system and method according to an embodiment of the invention.

FIG. 2 is a schematic diagram of the judgement support system of the first embodiment.

FIG. 3 is a schematic functional diagram of the computer shown in FIG. 2.

FIG. 4 is a functional block diagram explaining an inference operation.

FIG. 5 shows the format of a case file.

FIG. 6 shows the display layout of the case file.

DETAILED DESCRIPTION OF THE PREFERRED EMBODIMENTS

Figure 7:
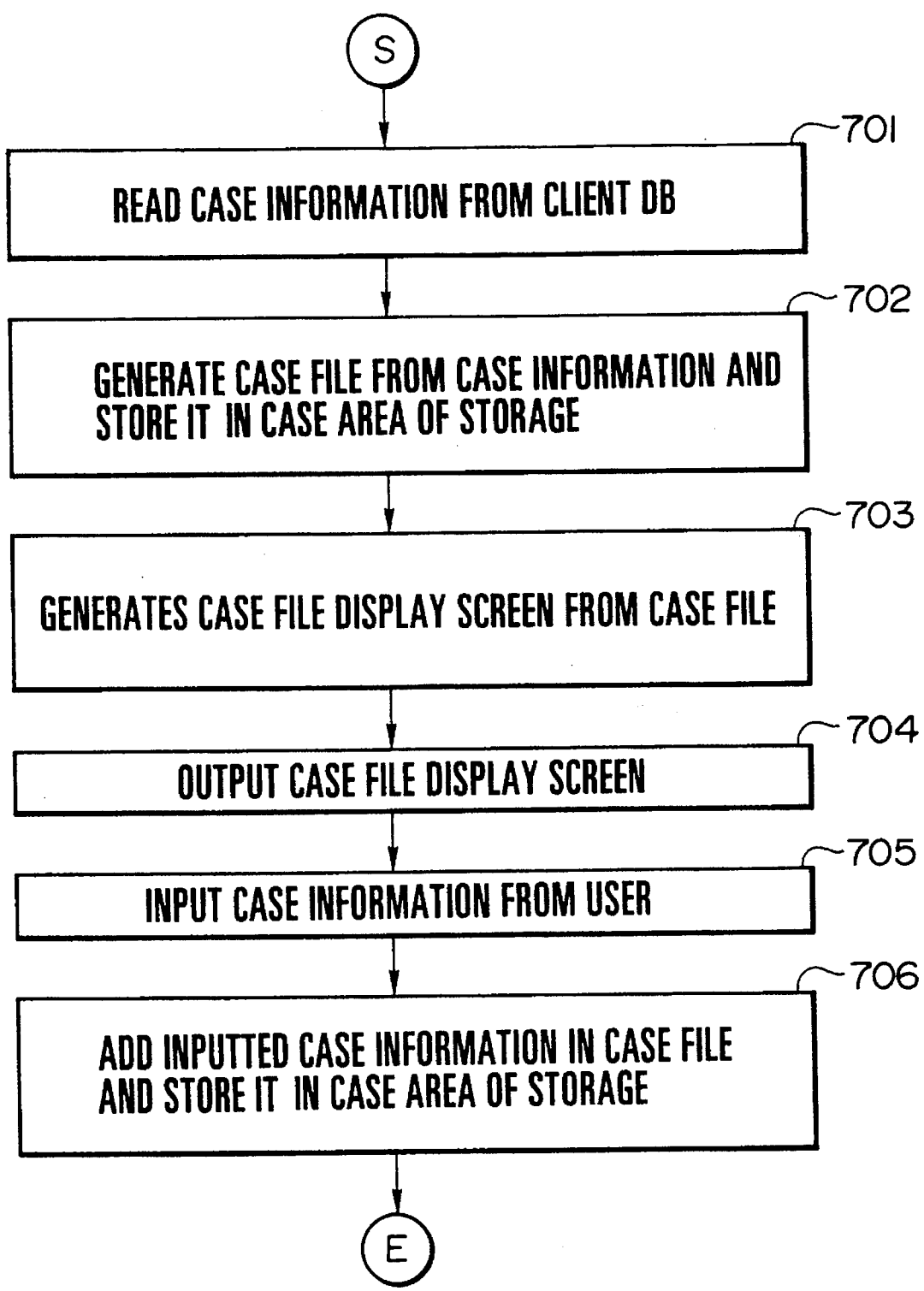
FIG. 7 is a detailed flow chart of Step 101 shown in FIG. 1.

An embodiment of the present invention will be described with reference to the accompanying drawings.

FIG. 1 is a flow chart showing the operation of a judgement support system and method according to an embodiment of the invention. FIG. 2 is a schematic diagram of the judgement support system of the first embodiment. FIG. 3 is a schematic functional diagram of the computer shown in FIG. 2.

First, the functional diagram of the judgement support system shown in FIG. 2 will be described.

This system includes an output device 202, an input device 203, a storage 204, respectively connected to a computer 201. The output device 202 may be a display capable of displaying information necessary for the judgement of a case. The storage 204 may be a device capable of storing information necessary for the judgement of a case. The input device 203 may be a device capable of inputting case information, investigation items, investigation results, and evaluation results. Such a computer system may be a creative workstation 3050 manufactured by Hitachi, Ltd.

The function of the computer 201 will be described with reference to FIG. 3.

The storage 204 stores a client database (DB) 314, an investigation KB 315, an attending matter KB 316, and a judgement KB 317, and has areas for storing information files outputted from the computer, such as a case area 318, an investigation area 319, an attending matter area 320, and a judgement or evaluation area 321. The investigation KB 315 may be a rule base which stores the know-how of detecting an investigation method in accordance with the contents of a case, the attending matter KB 316 may be a rule base which stores the know-how of drawing an attention regarding investigation, and the judgement KB may be a rule base which stores the know-how of determining the evaluation from the investigation result.

The case area 318 stores case information read by a case information read processing unit 303 of the computer 201. The investigation area 319 stores investigation method information outputted from an investigation inference unit 311 and a judgement inference unit 313 of the computer 319. The attending matter area 320 stores investigation attending matter information outputted from an attending matter inference unit 312 of the computer 201. A judgement area 321 stores judgement result information outputted from the judgement inference unit 313.

The computer 201 has the case information read processing unit 303, investigation item read processing unit 304, investigation result read processing unit 305, judgement result read processing unit 306, case information display processing unit 307, investigation method display processing unit 308, attending matter display processing unit 309, judgement result display processing unit 310, investigation inference unit 311, attending matter inference unit 312, and judgement inference unit 313. The case information read processing unit 303 receives case information from the client DB 314 or input device 203 and stores it in the case area 318 of the storage 204. The investigation item read processing unit 304 receives an investigation item from the input device 203 and sends it to the attending matter inference unit 312. The investigation result read processing unit 305 receives an investigation result from the input device 203 and sends it to the judgement inference unit 313. The judgment result read processing unit 306 received an evaluation from the input device 203 and stores it in the judgement area 321 of the storage 204. The case information display processing unit 307 displays information stored in the case area 318 of the storage 204 on the output device 202. The investigation method display processing unit 308 displays information stored in the investigation area 319 of the storage unit 204 on the output device 202. The attending matter display processing unit 309 displays information stored in the attending matter area 320 on the output device 202. The judgement result display processing unit 310 displays information stored in the judgement area 321 of the storage 204 on the output device 202. The investigation inference unit 311 reads information stored in the case area and the investigation KB 315 of the storage 204, infers necessary investigation data, and stores it in the investigation area 319 of the storage 204. The attending matter inference unit 312 reads information stored in the case area 318 of the storage 204 and the investigation item, infers attending matter data, and stores it in the attending matter area 320 of the storage 204. The judgement inference unit 313 reads information stored in the attending matter area 320 of the storage 204 and investigation result data from the input device 204, infers judgement result data, and stores it in the investigation area 319 and judgement area 321 of the storage 204.

The above processing units and inference units are realized by respective circuits in the computer 201.

The operation of the embodiment will be described with reference to the flow chart of FIG. 1 and to FIGS. 2 and 3.

First, case information such as attributes of a case is inputted to the case information read processing unit 303, and stored in the case area 318 (Step 101). The input of case information may be executed by reading it from the client DB 314, by inputting it from the input device 203, or by both.

Next, the case information stored in the case area 318 is read to the investigation inference unit 311 to infer an investigation item and store it in the investigation area 319 of the storage 204 (Step 102).

The investigation item stored in the investigation area 319 of the storage 204 is outputted to the output device 202 by using the investigation method display processing unit 308 of the computer (Step 108).

An investigation item entered from the input device 203 is read by the investigation item read processing unit 304 (Step 103).

The investigation item at Step 103 and the case information stored in the case area 318 of the storage 204 are read to the attending matter inference unit 312 to infer an investigation attending matter and store it in the attending matter area 320 of the storage 204 (Step 104).

The attending matter stored in the attending matter area 320 of the storage 204 is outputted to the output unit 202 by using the attending matter display processing unit 309 of the computer 201 (Step 1010).

An investigation result is inputted by a user from the input device 203 to the investigation result read processing unit 305 (Step 105).

The investigation result read at Step 105 and the attending matter stored in the attending matter area 320 are read to the judgement inference unit 313 of the computer 201 to infer an evaluation and store it in the judgment area 321 of the storage 204 (Step 106). This evaluation may include a renewal of the investigation item. In the case of a renewal, the contents of the investigation area 219 are updated.

The investigation item read processing unit 304 accesses the investigation area 219 to check whether there is any essential investigation item still not investigated (Step 1012). If there is an essential investigation item still not investigated, the investigating items are again displayed (Step 108), and if not, it is checked from an unrepresented check circuit whether the user has selected an "end" (Step 1014). If not selected, the flow returns to Step 108 to display again the investigation items. If selected, the user is allowed to enter a comment (Step 1016), to thereafter terminate the procedure.

The inference operation will be described with reference to FIG. 4.

The investigation inference unit 311 reads information stored in the case area 318 and investigation KB 315 to infer necessary investigation item and store it in the investigation area 319.

The attending matter inference unit 312 reads information stored in the case area 318 and attending matter KB 316 to infer an attending matter indicating a particular investigation subject and an investigation method and store it in the attending matter area 320.

The judgement inference unit 313 reads information stored in the attending matter area 320 and the judgement KB 317 to infer an additional investigation item and a judgement result and to store the inference history in a history area 401 of the judgement area 321, to store the additional investigation item in the investigation area 319, and to store the judgement result in a final judgement area 402 of the judgement area 402, respectively.

The details of the flow chart shown in FIG. 1 will be described with reference to FIGS. 5 to 19.

First, the details of Step 101 will be described with reference to FIGS. 5 to 7.

An example of a case file 501 shown in FIG. 5 will be described. The case file 501 shows an example of case information to be stored in the case area 318 of the storage 204. The case file 501 includes a serial No. field 502, a field 503 for an attribute name of a case, and an attribute content field 504. If there is information already stored in the client DB 205 of the storage 204, such as "acceptance number", "corporation name", and "applicant name", the case information read processing unit 303 of the computer 201 reads the information from the client DB 205 and stores it in the case file 501. If there is information still not entered in the system, such as "permission/approval number, the case information read processing unit 303 of the computer 201 reads the information from the input device 203 and stores it in the case file 501.

A display example of the case file shown in FIG. 6 will be described. A case file display screen 601 includes an established case content area 602 for displaying information already stored in the system, and an unsettled case content area 603 for entering information still not stored in the system. The established case content area 602 and unsettled case content area 603 have attribute name fields 604 and 606 and attribute content fields 605 and 607, respectively. Information for the attribute name fields 604 and 606 and the attribute content field 605 is read from the case file 501 by the case information display processing unit 307 and outputted to the output device 202. Information for the attribute content field 607 is read from the input device 203 by the case information read processing unit 307 and added to the case file 501.

The operation of Step 101 will be detailed with reference to the flow chart of FIG. 7 and with reference to the structure of the apparatus shown in FIGS. 2 and 3, the case file example shown in FIG. 5, and the case file display example shown in FIG. 6.

Information of a case to be judged is read from the client DB 314 of the storage 201 by the case information read processing unit 303 of the computer 201 (Step 701).

The case information read processing unit 303 of the computer 201 reads from the client DB 205 the case information already stored therein, such as "acceptance number, "corporation name", and "applicant" to generate the case file 501 and store it in the case area 318 of the storage 204 (Step 702).

The case information display processing unit 307 of the computer 201 generates the case file display screen 601 from the case file 501 (Step 703).

The case information display processing unit 307 of the computer 201 displays the case file display screen 601 on the output device 202 (Step 704).

The case information read processing unit 303 of the computer 201 receives case information still not entered from the user via the input device 203, the information including, for example, "presence/absence of a permission/approval number", "state of explanation of documents presented by the applicant", and "relation between the applicant and an actual manager" (Step 705).

The case information entered at Step 705 is added to the case file 601 and stored in the case area 318 of the storage unit 204 (Step 706).

Figure 8:
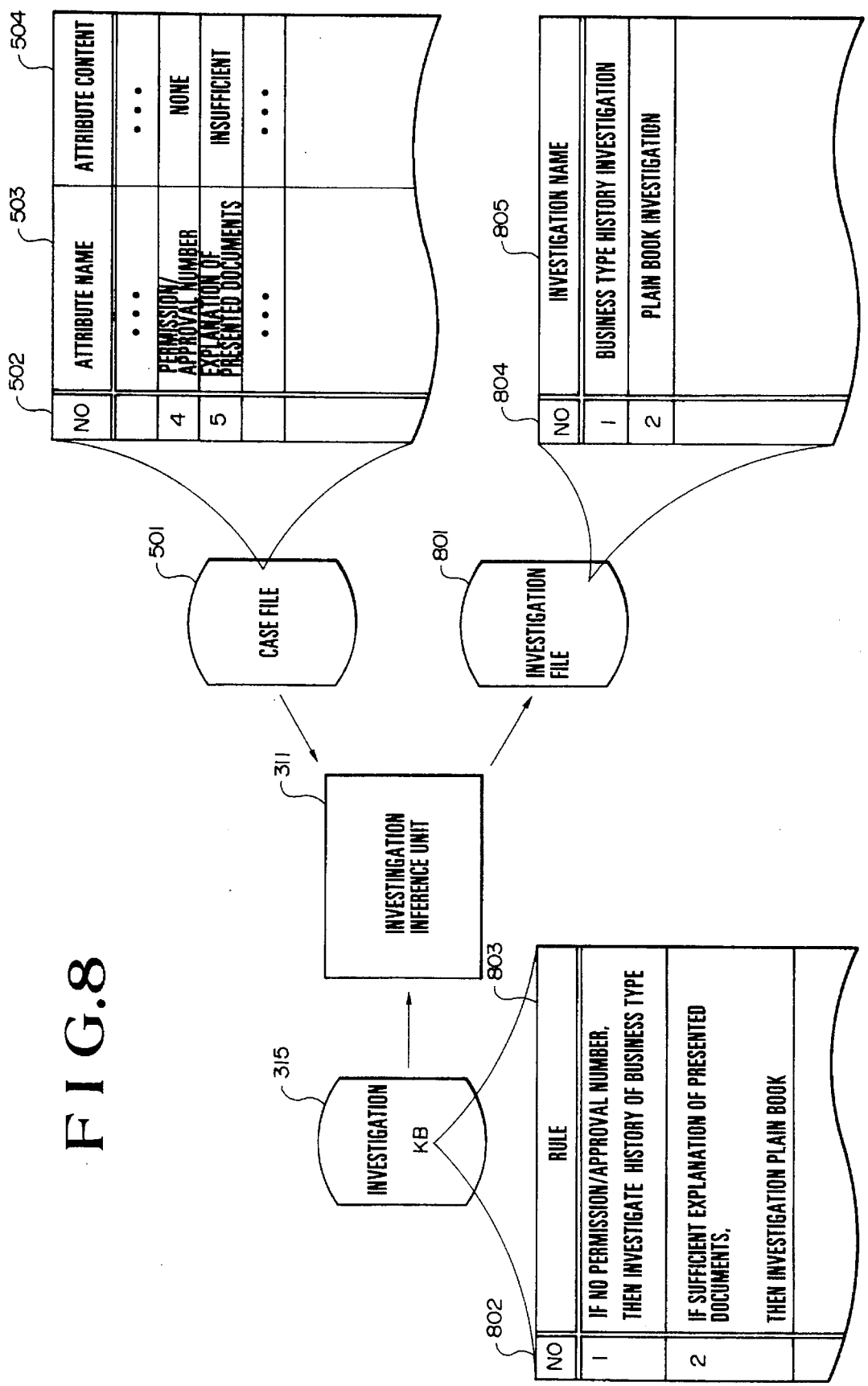
FIG. 8 illustrates an example of the operation of the investigation inference unit.
Figure 9:
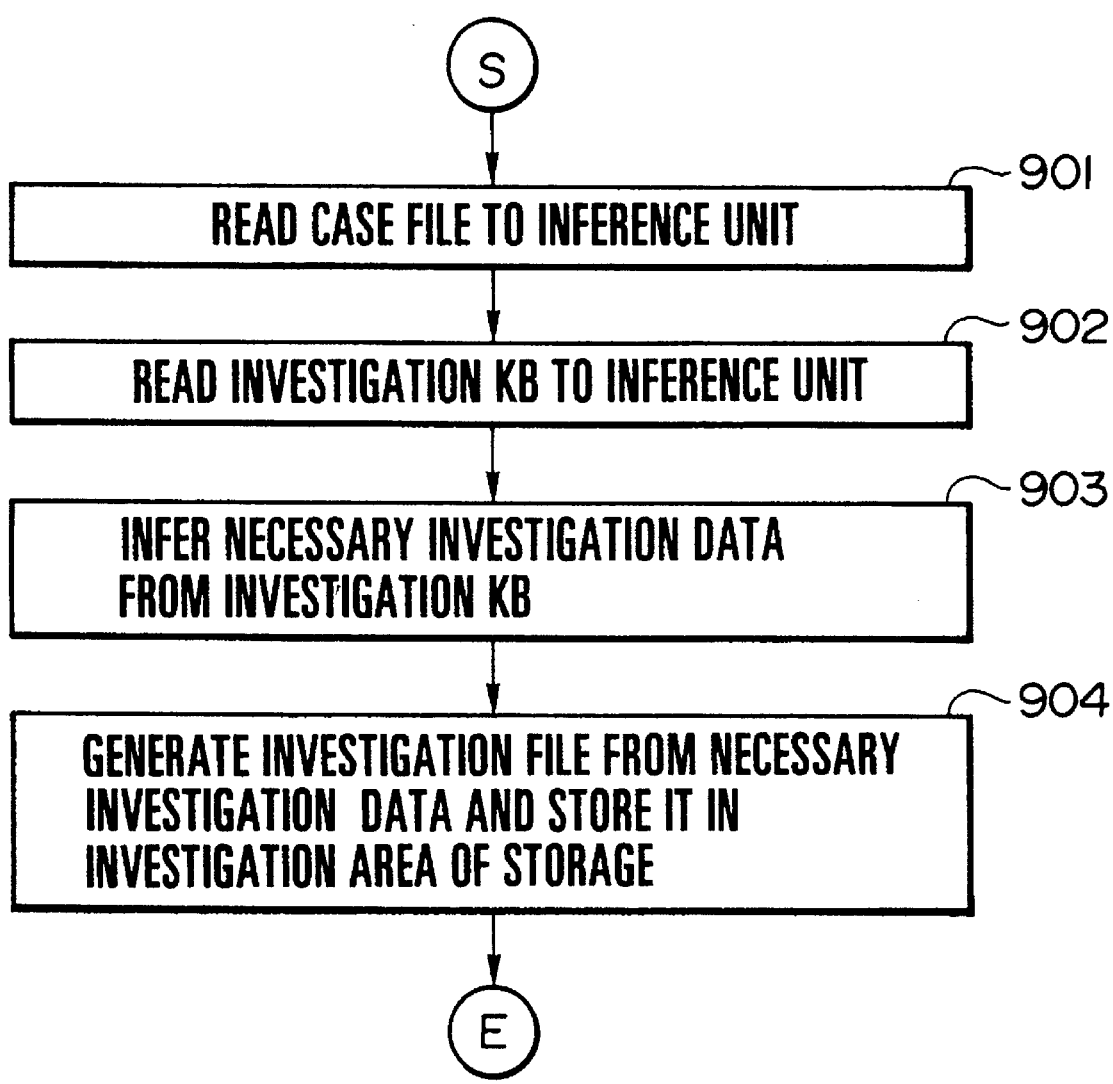
FIG. 9 is a detailed flow chart of Step 102 shown in FIG. 1.

The details of Step 102 will be given with reference to FIGS. 8 and 9.

The operation of the investigation inference unit 311 will be described with reference to FIG. 8. The investigation inference unit 311 reads information stored in the case file 501 and investigation KB 315 of the storage unit 204, and outputs it to an investigation file 801. The case file 501 includes the serial No. field 502, the field 503 for an attribute name of a case, and the attribute content field 504. Information stored in these fields has been described already. The investigation KB 315 includes a serial No. field 802 and a rule field 803. The investigation file 801 includes a serial No. field 804 and an investigation name field 805. For example, if the case file 501 stores case information "no permission/approval number" and the investigation KB 315 stores a rule of "if no permission/approval number, then investigate history of business type", the investigation name "history investigation of business type" is stored in the investigation file.

The operation of Step 102 will be detailed with reference to the flow chart of FIG. 9 and with reference to the structure of the apparatus shown in FIGS. 2 and 3 and the operation example of the investigation inference unit 311 shown in FIG. 8.

First, information of a case to be judged is read from the case file 501 of the storage 204 to the investigation inference unit 311 (Step 901).

The investigation KB 315 of the storage 204 is read to the investigation inference unit 311 of the computer 201 (Step 902).

The investigation inference unit 311 of the computer 201 infers necessary investigation data (Step 903).

The investigation inference unit 311 of the computer 201 generates the investigation file 801 from the inferred necessary investigation data, and stores it in the investigation area 319 of the storage 204 (Step 904).

Figure 10:
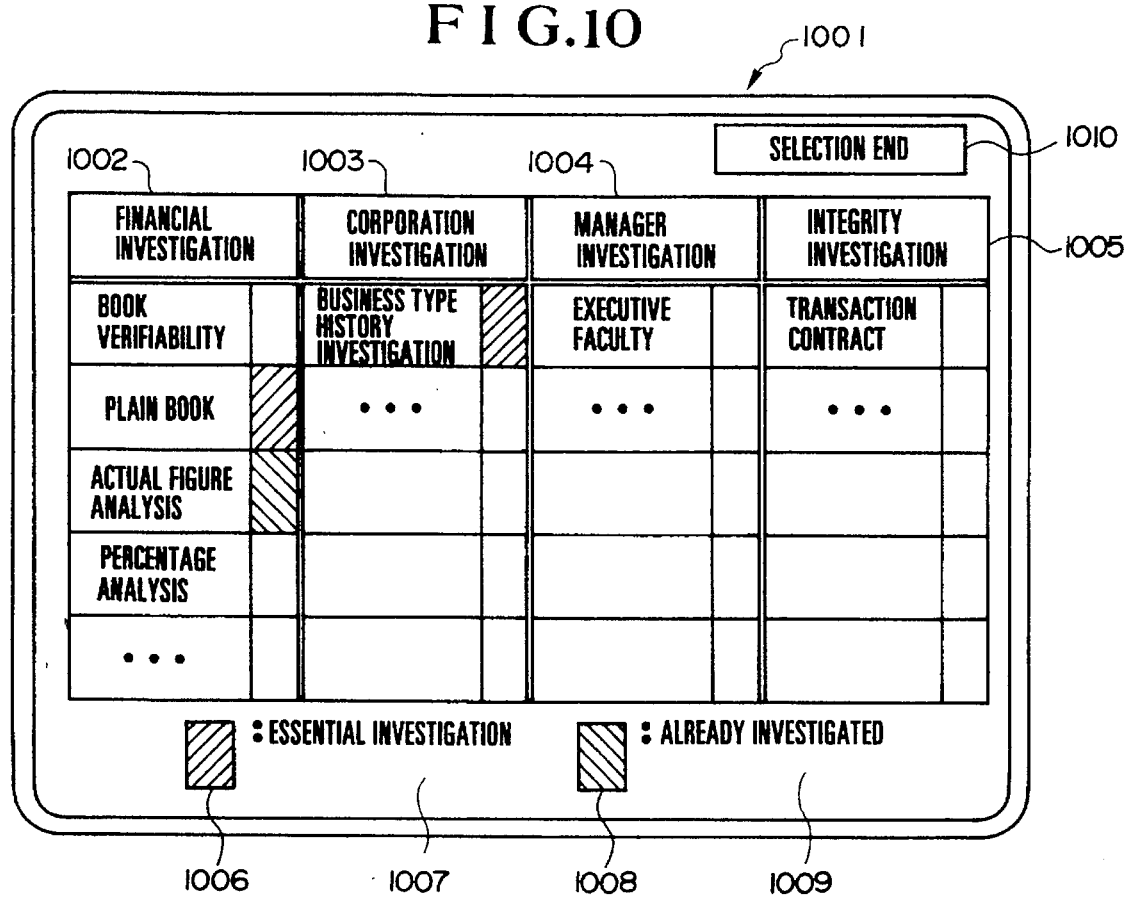
FIG. 10 shows the display layout of the investigation file.
Figure 11:
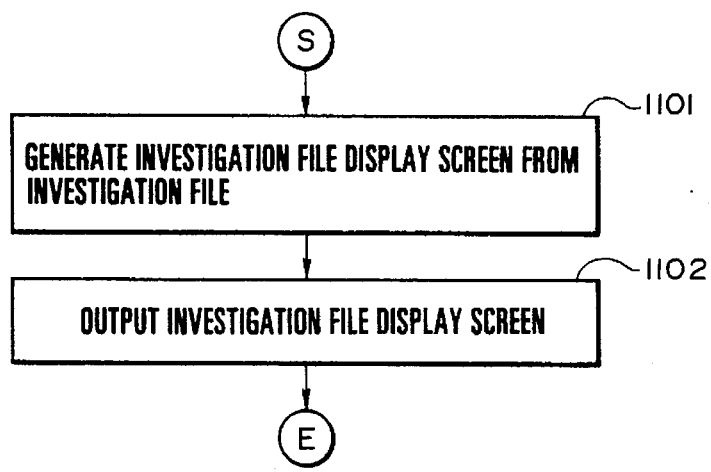
FIG. 11 is a detailed flow chart of Steps 108 and 109 shown in FIG. 1.

Next, the details of Steps 108 and 103 will be described with reference to FIGS. 10 and 11.

An example of an investigation file display screen shown in FIG. 10 will be described. An investigation file display screen 1001 includes a financial investigation area 1002 for displaying financial investigation items, a corporation investigation area 1003 for displaying corporate investigation items, a manager investigation area 1004 for displaying manager investigation items, an integrity investigation area 1005 for displaying integrity investigation items, a symbol 1006 for representing an essential investigation item, an essential investigation message area 1007 for displaying a message explaining the meaning of the symbol 1006, a symbol 1008 for representing an already investigated item, an already investigated item message area 1009 for displaying a message explaining the meaning of the symbol 1008, and a selection end key 1010. Examples of items to be displayed in the financial investigation area 1002 are "book verifiability investigation", "plain book investigation", "actual figure analysis", "percentage analysis", and the like. Other items are, for example, "business type history investigation" in the corporation investigation area 1003, "executive faculty" in the manager investigation area 1004, and "transaction contract investigation" in the integrity investigation field 1005. In this example, the essential investigation items in the investigation file 801 inferred by using the investigation KB 315 are "plain book investigation" and "business type history investigation". The two investigation items are indicated by the symbol 1006 displayed on the right column of each item. For example, if after the "actual figure analysis" investigation a judgement has been completed by using the judgement KB 317, the symbol 1008 indicating an investigation completion is displayed on the right column of the "actual figure analysis" item. In selecting an investigation item, the symbol 1006 displayed on the right column of a desired investigation item is clicked by the input device 203 such as a mouse. A selection end key 1010 is clicked if there is no selection.

The operation of Steps 108 and 103 shown in the flow chart of FIG. 11 will be described with reference to the structure of the apparatus shown in FIGS. 2 and 3 and the example of the investigation file display screen 1001 shown in FIG. 10.

First, the investigation method display processing unit 308 of the computer 201 reads the investigation file 801 from the investigation area 319 of the storage 204 and generates the investigation file display screen (Step 1101).

The investigation item display processing unit 308 of the computer 201 outputs the investigation file display screen 1001 to the output device (Step 1102).

Figure 12:
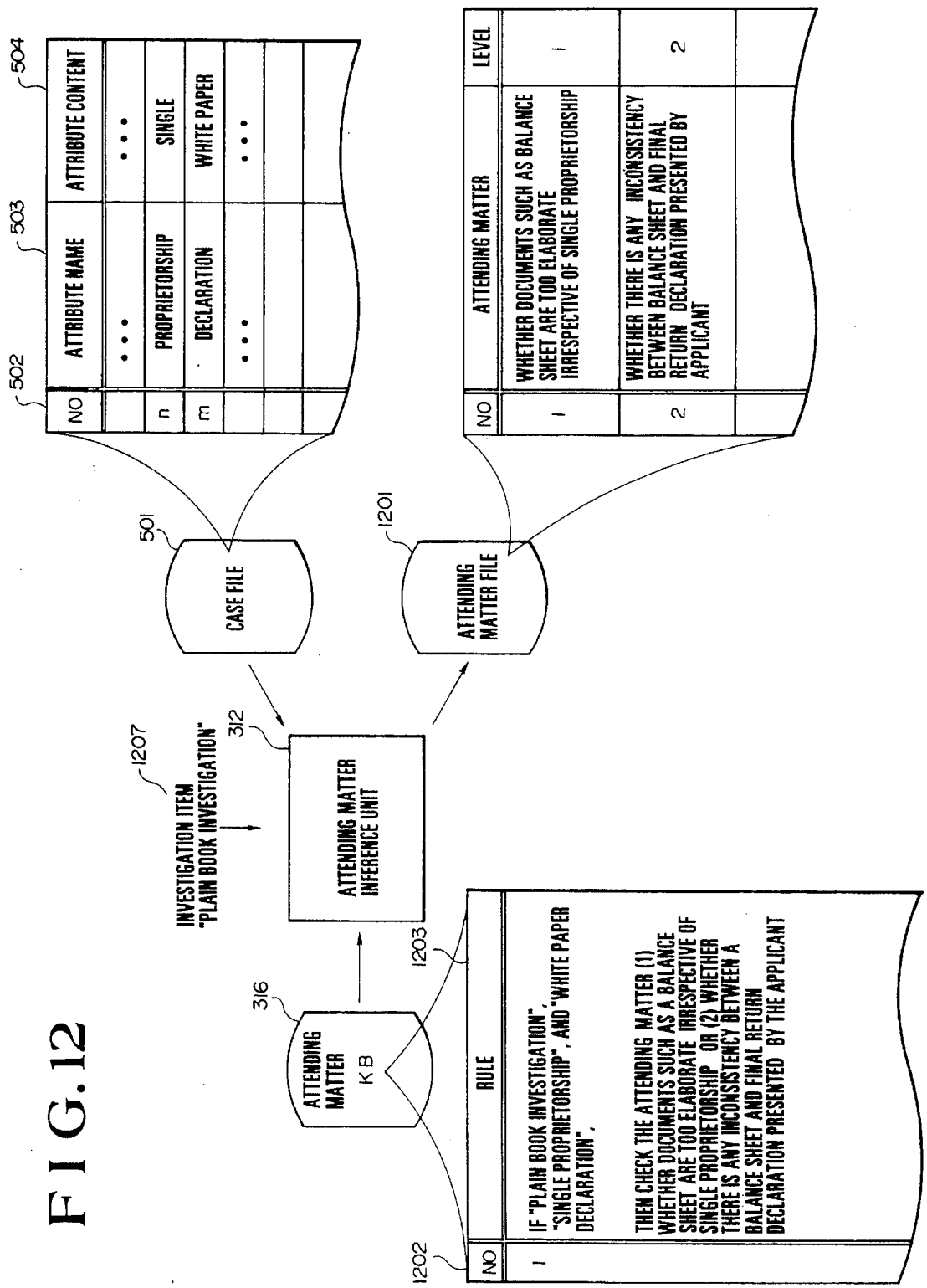
FIG. 12 illustrates an example of the operation of the attending matter inference unit.
Figure 13:
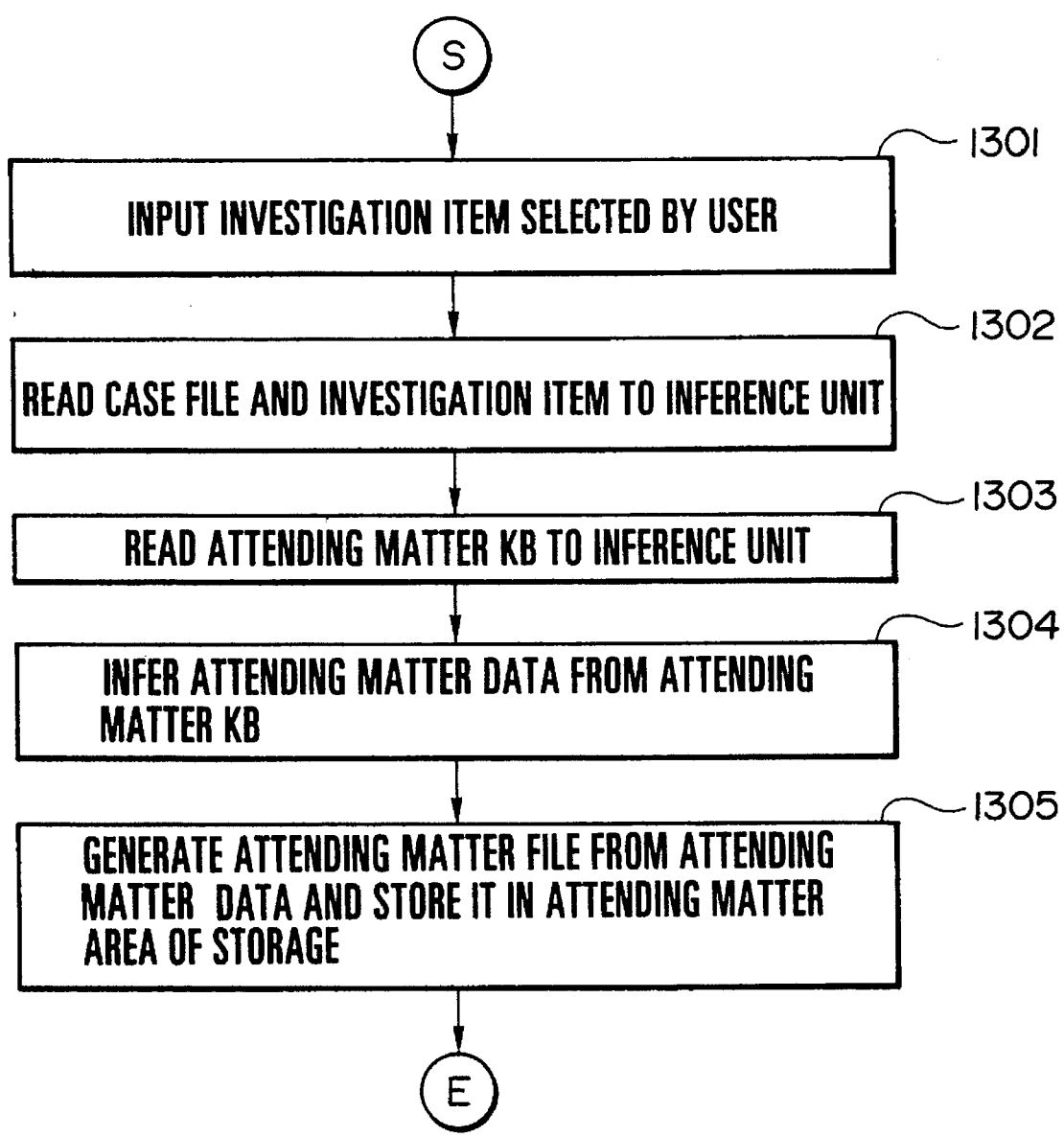
FIG. 13 is a detailed flow chart of Step 104 shown in FIG. 1.

The details of Step 104 will be given with reference to FIGS. 12 and 13.

An example of the operation of the attending matter inference unit 312 shown in FIG. 12 will be described. The attending matter inference unit 311 reads information stored in the case file 501 and attending matter KB 316 of the storage 204 to generate an attending matter file 1201 and store it in the storage 204. The case file 501 includes the serial No. field 502, the field 503 for an attribute name of a case, and the attribute content field 504. Information stored in these fields has been described already. The attending matter KB 316 includes a serial NO. field 1202 and a field 1203 for storing rules. The attending matter file 1201 includes a serial NO. field 1204, a field 1205 for storing attending matters, and a field 1205 for storing the level of each attending matter. For example, it is assumed that a selected investigation name 1207 is "plain book investigation". It is further assumed that the case file 501 stores as case information "single proprietorship" and "white paper declaration". It is still further assumed that the attending matter KB 316 stores a rule of [if "plain book investigation", "single proprietorship", and "white paper declaration", then check the attending matter (1) whether documents such as a balance sheet are too elaborate irrespective of single proprietorship or (2) whether there is any inconsistency between a balance sheet and a final return declaration presented by the applicant]. On the above assumptions, the attending matters (1) and (2) together with their levels are stored in the attending matter filer 1201.

The attending matter of level "1" is an attending matter inferred by an established rule and is required to be necessarily checked by a user. The attending matter of level "2" is an attending matter inferred by a recommended rule and is required to be drawn attention by a user. These attending matters are displayed as inquiries to a user.

The operation of Step 104 will be detailed with reference to the flow chart of FIG. 13 and with reference to the structure of the apparatus shown in FIGS. 2 and 3 and the operation example of the attending matter inference unit 312 shown in FIG. 12.

First, an investigation item selected by the user is entered from the input device 203 (Step 1301).

The attending matter inference unit 312 of the computer 201 reads information of the case file 501 of the storage 204 and the entered investigation item (Step 1302).

The attending matter inference unit 312 of the computer 201 reads information of the attending matter KB 316 (Step 1303), and infers attending matter data (Step 1304).

An attending matter file 1201 is generated from the attending matter data inferred by the attending matter inference unit 312 of the computer 201, and is stored in the attending matter area 320 of the storage 204 (Step 1305).

The details of Steps 110 and 105 will be described with reference to FIGS. 14 and 15.

An example of an attending matter display screen shown in FIG. 14 will be described. An attending matter display screen 1401 includes an investigation item area 1402 for displaying an investigation item, an area 1403 for displaying a message for colors which discriminate between the levels of attending matters, a title area 1404 for displaying the title of displayed attending matters, an attending matter area 1405 for displaying attending matters, an area 1406 for displaying a check result of each attending matter entered by a user, a basic data area 1407 for displaying basic data necessary for investigation such as books in this embodiment, and an area 1408 for displaying remarks on investigation. A message of (1) whether documents such as a balance sheet are too elaborate irrespective of single proprietorship, inferred by the attending matter KB 316 and stored in the attending matter file 1201, is displayed in the attending matter area 1405 in "red" color indicating the level "1". Another message of (2) whether there is an inconsistency between a balance sheet and a final return declaration presented by the applicant, is displayed in "blue" color indicating the level "2" and given a default symbol "x". Since this is a default symbol, an input of this symbol can be omitted if the user confirms that it is not necessary to check the attending matter (2).

Basic data is entered by the user in advance. Prior to displaying the screen shown in FIG. 14, a screen urging the user to enter basic data is displayed. This basic data is inputted from a keyboard or by using a scanner. The remark on investigation gives a more detailed explanation of each attending matter, and includes such as a description of a term and the reason for investigation.

Figure 14:
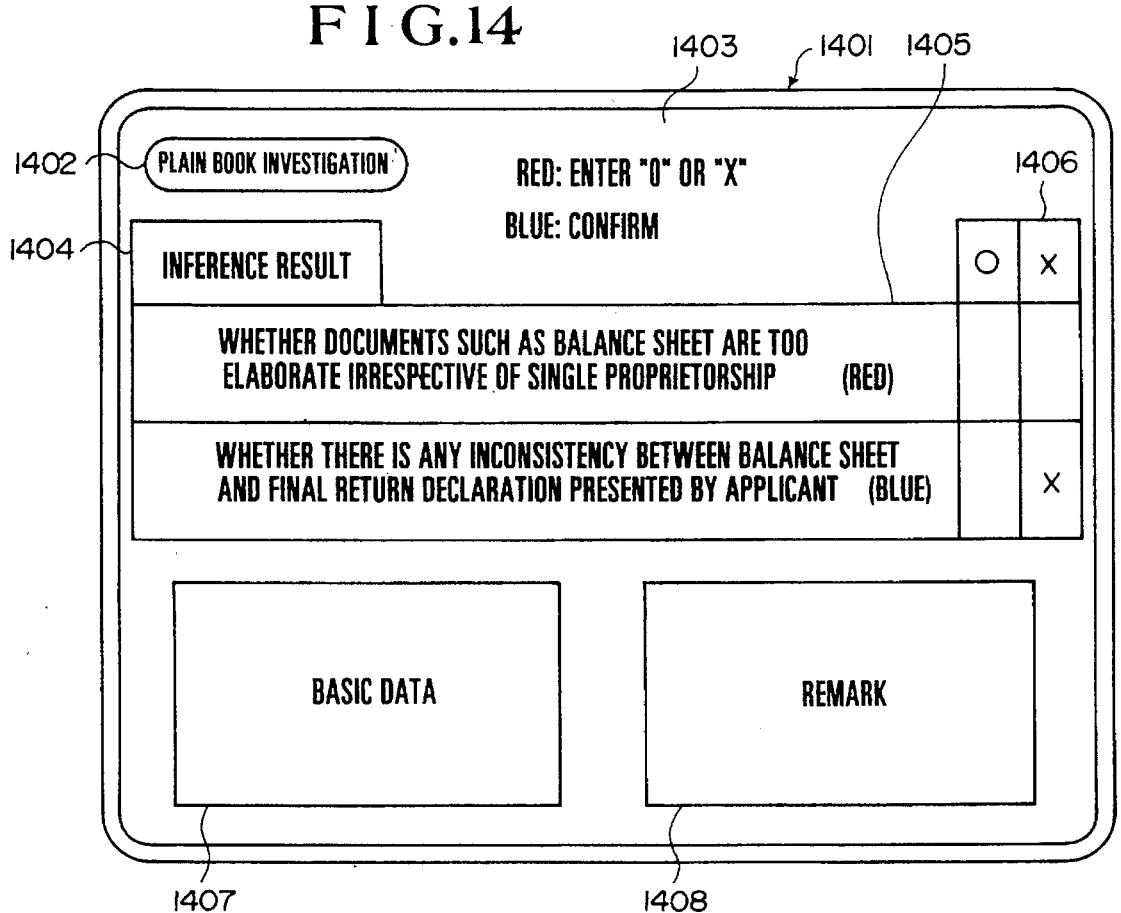
FIG. 14 shows the display layout of the attending matter file.
Figure 15:
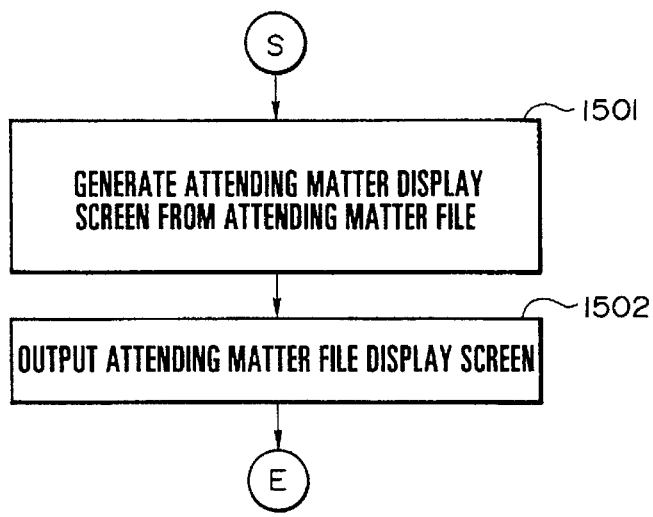
FIG. 15 is a detailed flow chart of Steps 110 and 105 shown in FIG. 1.

In the screen shown in FIG. 14, the areas 1407 and 1408 are generally used by a DSS tool, and the other areas are used by an AI tool.

The operation of Steps 110 and 105 will be detailed with reference to the flow chart of FIG. 15 and with reference to the structure of the apparatus shown in FIGS. 2 and 3 and the example of the attending matter file display screen shown in FIG. 14.

The attending matter display processing unit 309 of the computer 201 reads the attending matter file 1201 from the attending matter area 320 of the storage 204 and generates the attending matter file display screen (Step 1501).

The attending matter display processing unit 309 of the computer 201 displays the attending matter file display screen 1001 on the output device 202 (Step 1502).

Figure 16:
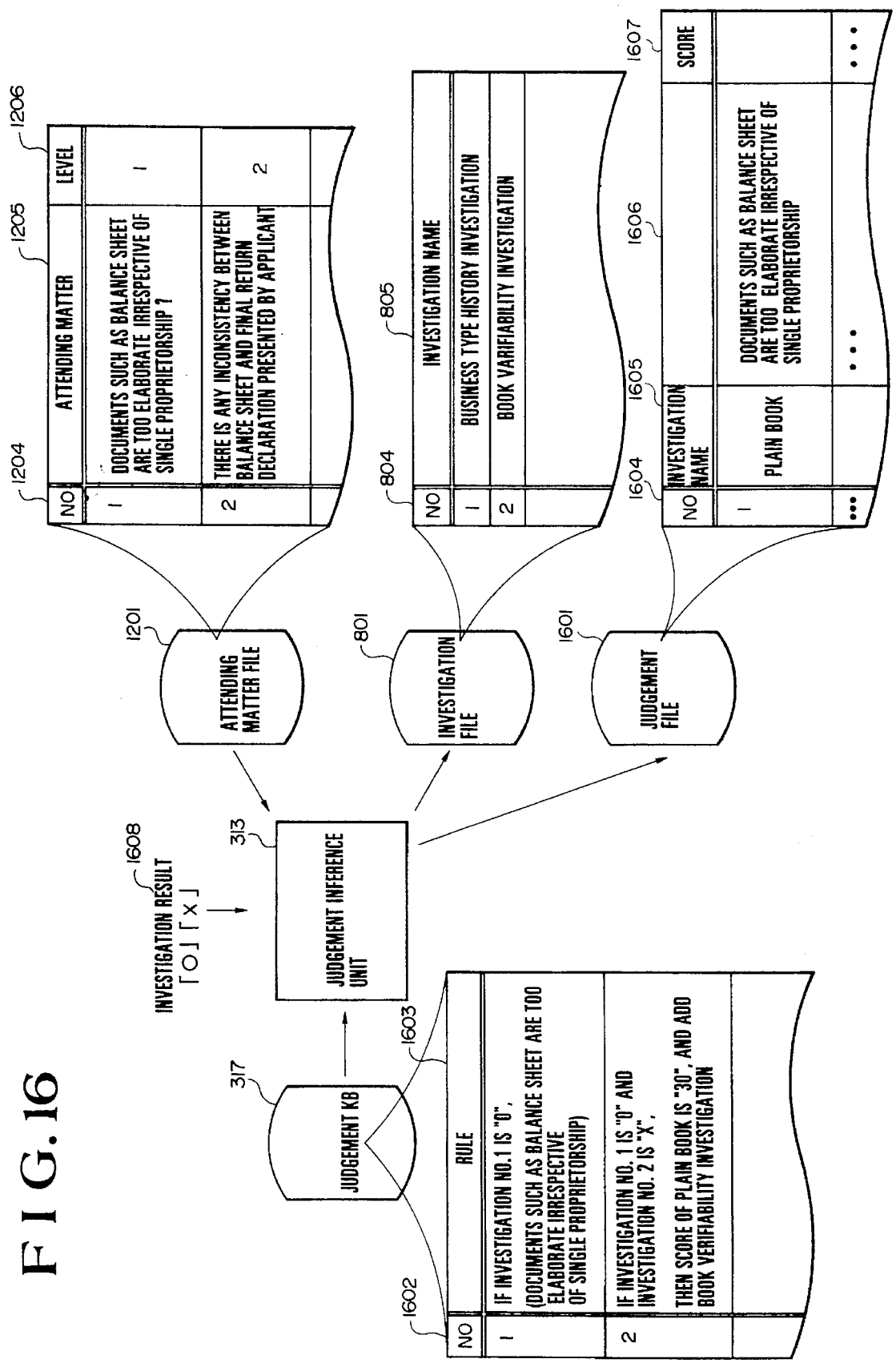
FIG. 16 illustrates an example of the operation of the judgement inference unit.
Figure 17:
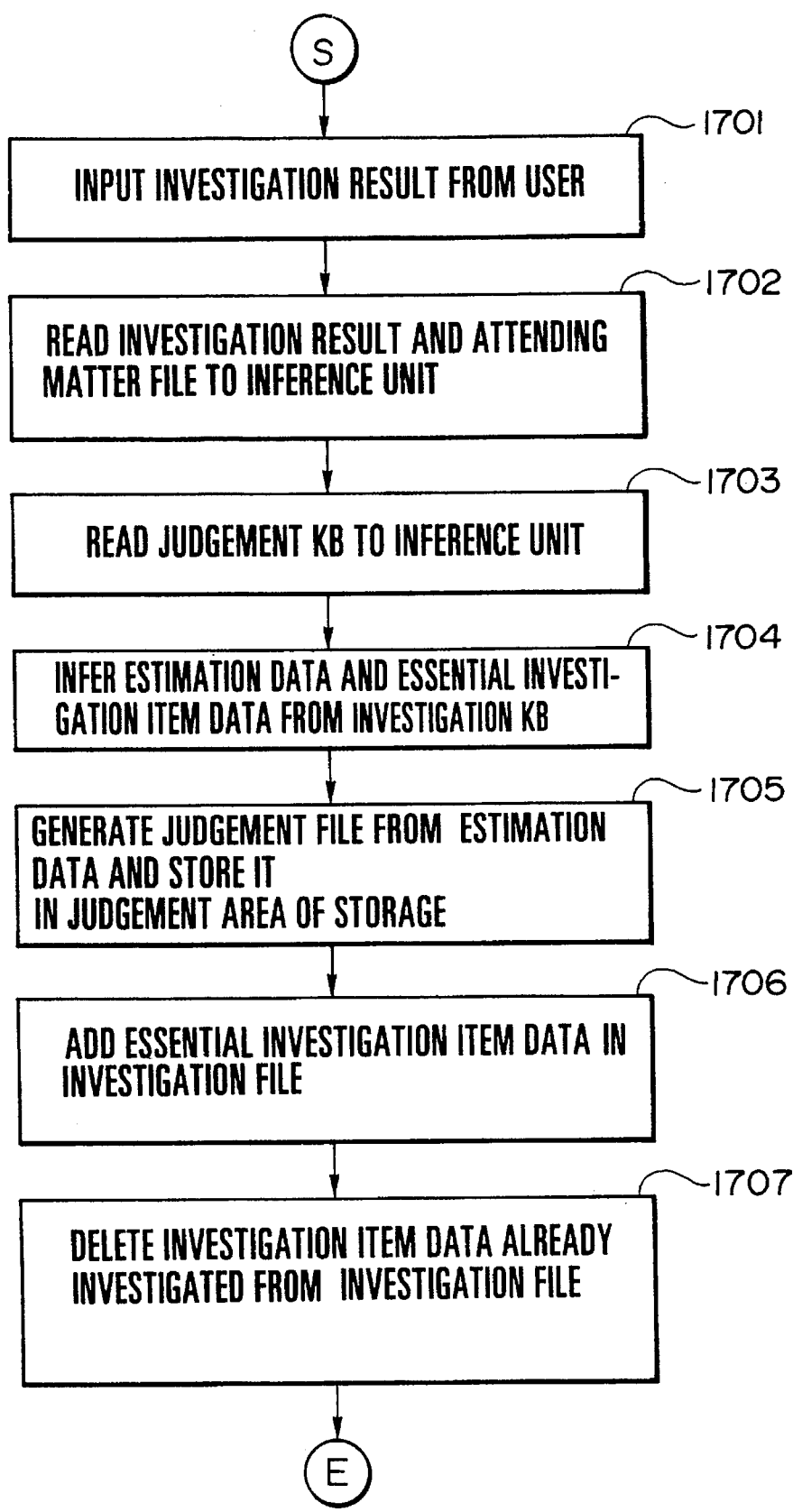
FIG. 17 is a detailed flow chart of Step 106 shown in FIG. 1.

Next, the detail of Step 106 will be described with reference to FIGS. 16 and 17.

An example of the operation of the judgement inference unit 313 shown in FIG. 16 will be described. The judgement inference unit 313 reads information stored in the attending matter file 1201 and judgement KB 317 of the storage 204, and infers an evaluation to generate a judgement file 1601 or to update the investigation file 801 (in this embodiment, to add an essential investigation item). The attending matter file 1201 includes the serial NO. field 1204, the field 1205 for storing attending matters, and the field 1205 for storing the level of each attending matter. Information stored in these fields has been described already. The judgement KB 317 includes a serial NO. field 1602 and a field 1603 for storing rules. A judgement file 1601 includes a serial NO. field 1604, a judged investigation name field 1605, a judgement history field 1606, and a judgement score field 1607. For example, it is assumed that an investigation result 1608 is "o" for the attending matter (1) and "x" for the attending matter (2). It is further assumed that the attending matter file 1201 stores the attending matter (1) whether documents such as a balance sheet are too elaborate irrespective of single proprietorship, as the level "1", and stores the attending matter (2) whether there is any inconsistency between a balance sheet and a final return declaration presented by the applicant, as the level "2". It is still further assumed that the judgement KB 317 stores a rule of [if the investigation result for the attending matter (1) is "o", or [if the investigation result is "o" for the attending matter (1) and "x" for the attending matter (2), then judge that "a score of the plain book investigation is "30" and the book verifiability investigation name is added]. On the above assumptions, the investigation item "book verifiability investigation" is added to the investigation file 801. In addition, the investigation name "plain book investigation", the judgement history "documents such as a balance sheet are too elaborate irrespective of single proprietorship", and the score of 30 points, are stored in the judgement file 1601.

The operation of Step 106 will be detailed with reference to the flow chart of FIG. 17 and with reference to the structure of the apparatus shown in FIGS. 2 and 3 and the example of the operation of the judgement inference shown in FIG. 17.

First, a user inputs an investigation result 1608 from the input unit 203 (Step 1701).

The judgement inference unit 313 of the computer 201 reads information of the attending matter file 1201 of the storage 201 and the entered investigation result (Step 1702).

The judgement inference unit 313 of the computer 201 reads information of the judgement KB 317 of the storage 201 (Step 1703).

The judgement inference unit 313 of the computer 201 infers the evaluation data and the essential investigation item data to be added (Step 1704).

A judgement file 1601 is generated by the judgement inference unit 313 of the computer 201 from the evaluation data inferred by the judgement inference unit 313 (Step 1705).

The additional essential investigation data inferred by the judgement inference unit 313 of the computer 201 is stored in the investigation file 801 in the investigation area 321 of the storage 204 (Step 1706).

The investigation data having been judged by the judgement inference unit 313 of the computer 201 is deleted from the investigation file 801 in the investigation area 321 of the storage 204.

Figure 18:
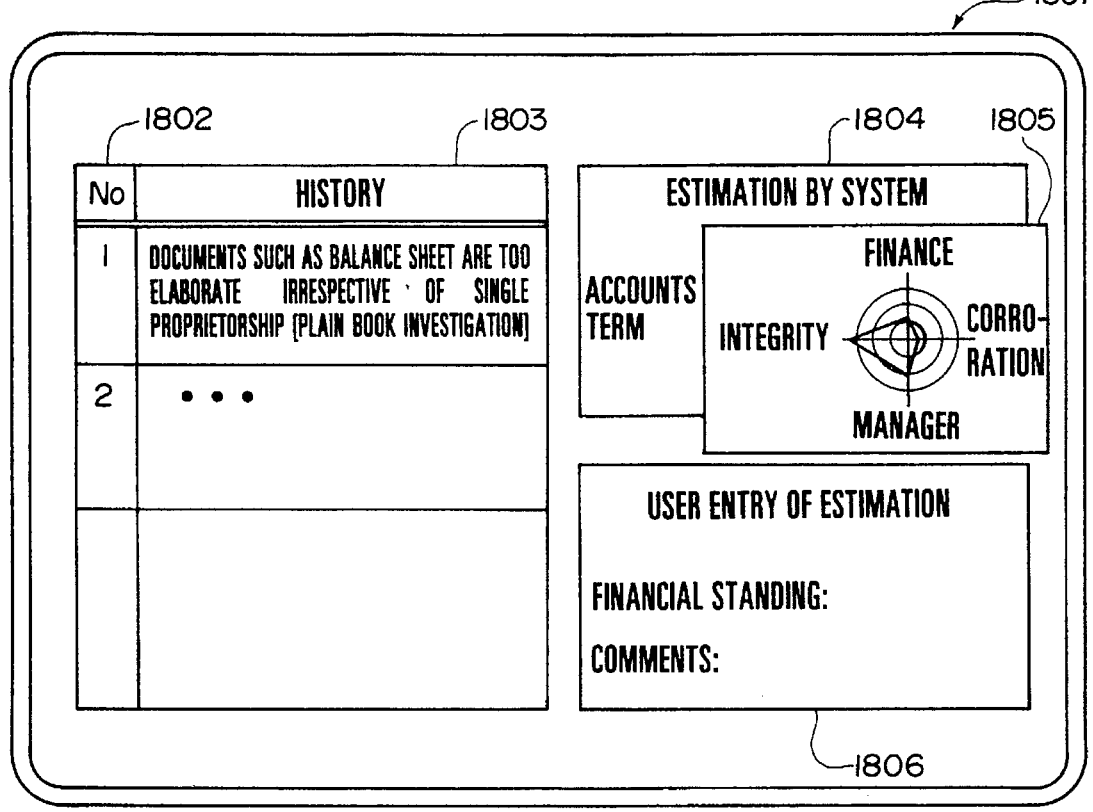
FIG. 18 shows the display layout of the judgement file.
Figure 19:
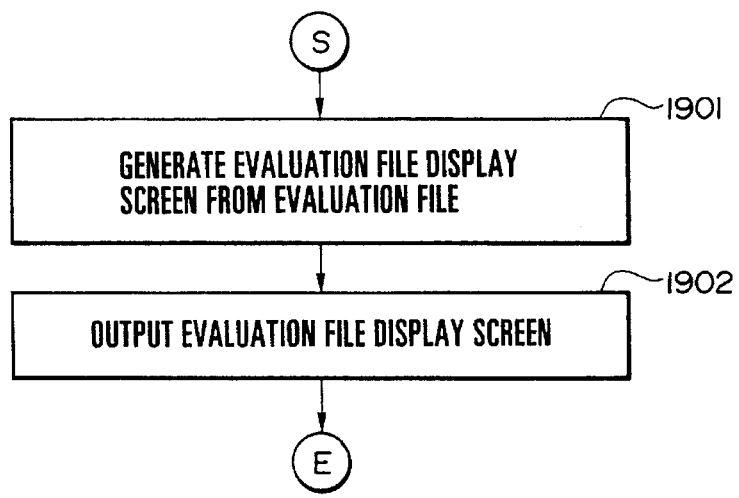
FIG. 19 is a detailed flow chart of Steps 109 and 107 shown in FIG. 1.
Figure 20:
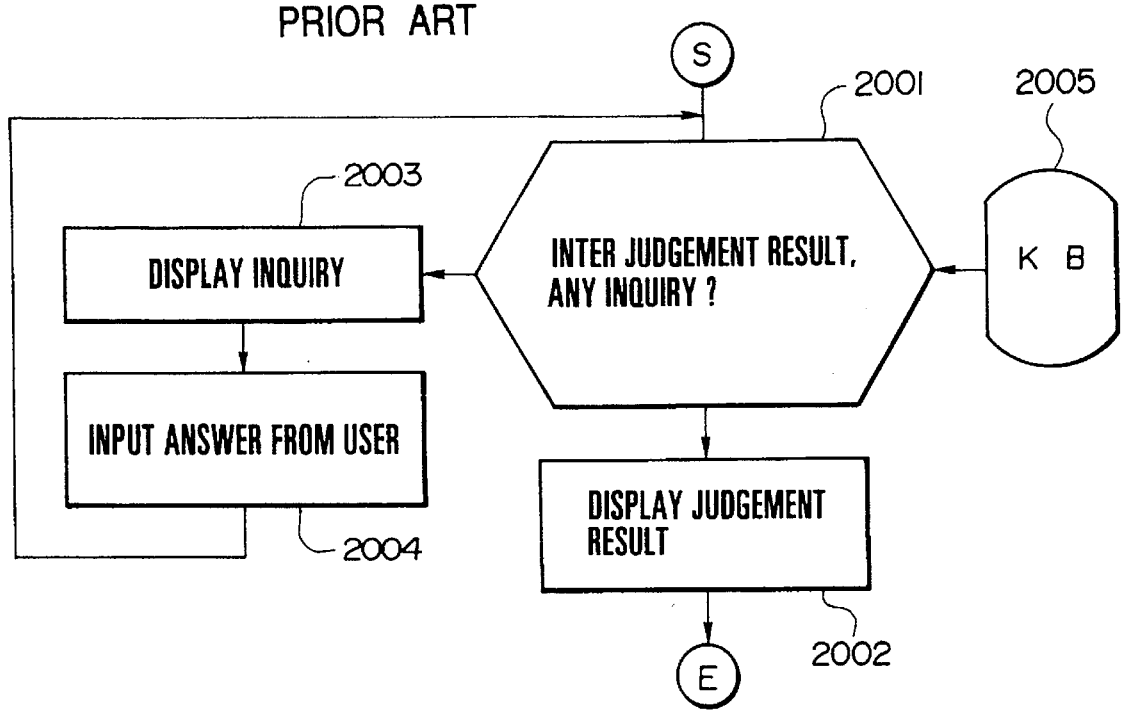
FIG. 20 is a flow chart explaining the operation of an A/I tool.
Figure 21:
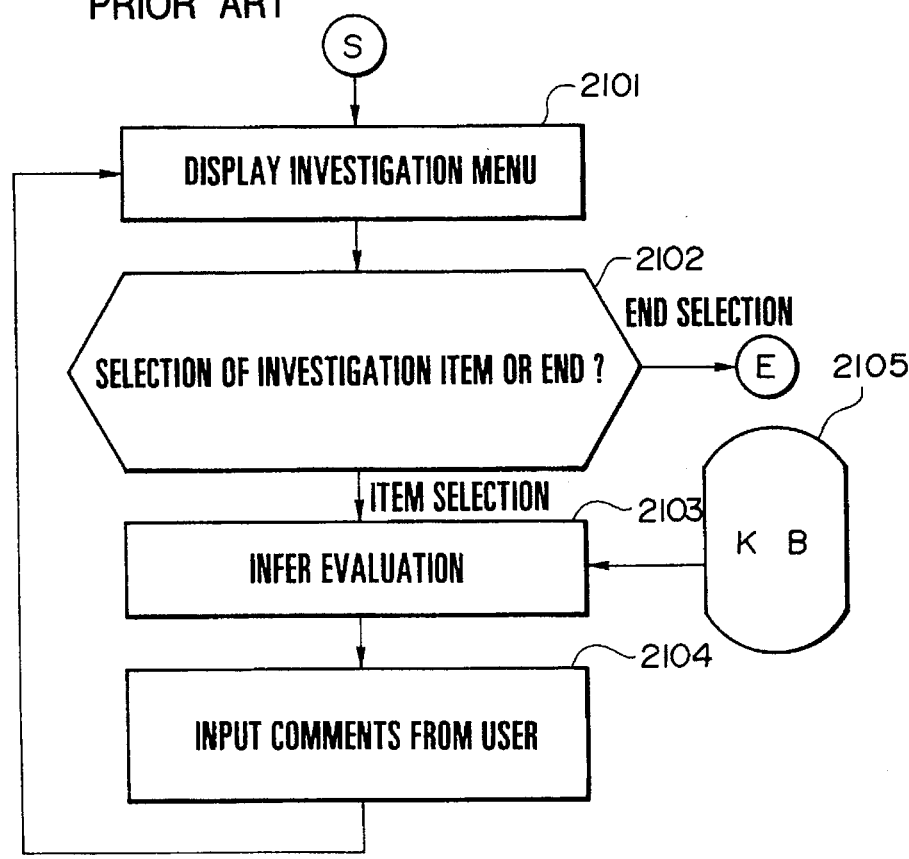
FIG. 21 is a flow chart explaining the operation of a DSS tool.
Figure 22:
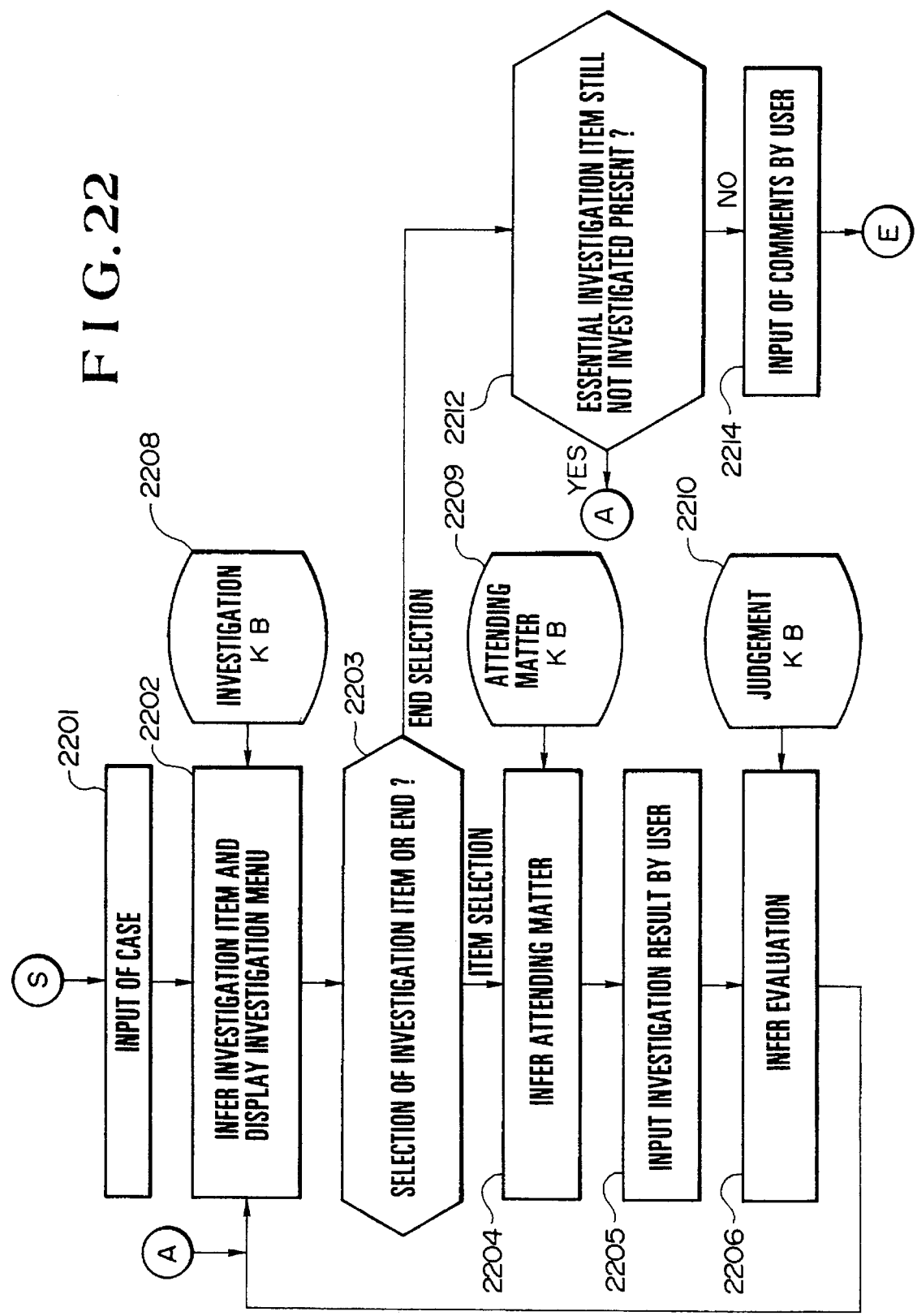
FIG. 22 is a flow chart explaining the outline of the operation of a system which integrates an A/I tool and a DSS tool according to the present invention.
Figure 23:
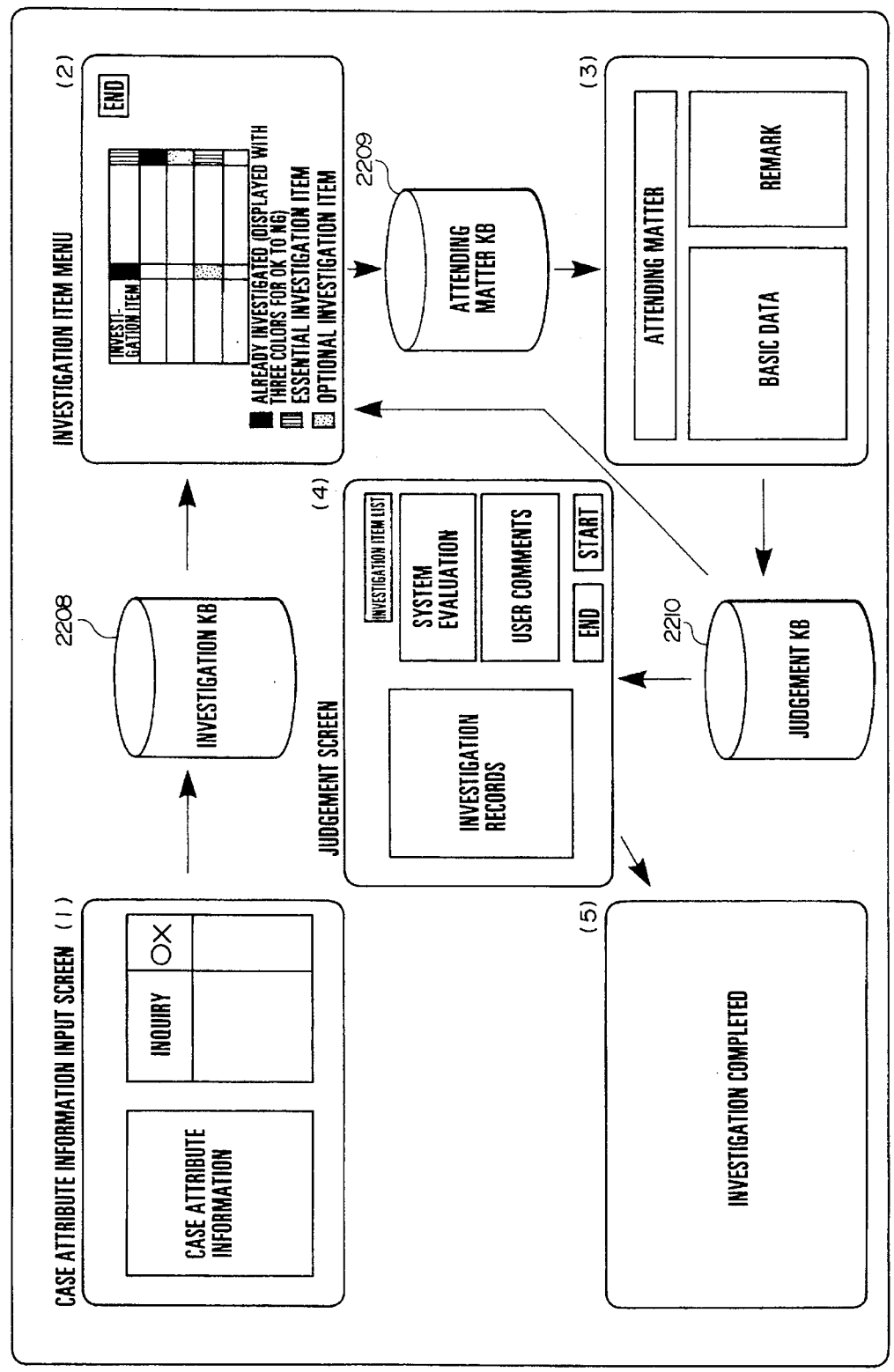
FIG. 23 illustrates a change of the display screen corresponding to the operation sequence explained with FIG. 22.

The details of Steps 109 and 107 will be described with reference to FIGS. 18 and 19.

An example of a judgement file display screen shown in FIG. 18 will be described. A judgement file display screen 1801 includes a history serial No. area 1802 for displaying serial numbers of investigated, i.e., inputted attending matters, a history area 1803 for displaying a judgement history, an evaluation area 1804 for displaying an evaluation made by the system, an evaluation chart area 1805 for displaying a chart indicating the evaluation made by the system, and a user entry area 1806 for displaying a judgement result made by a user. The history area 1803 displays the judgement history "single proprietorship" and the like inferred by the judgement KB 317 and stored in the judgement file 1601. The total score of each investigation is used for generating the display data for the evaluation area 1804 and evaluation chart area 1805.

The operation of Steps 109 and 107 will be detailed with reference to the flow chart of FIG. 19 and with reference to the structure of the apparatus shown in FIGS. 2 and 3 and the example of the judgement file display screen 1801 shown in FIG. 18.

First, the judgement display processing unit 310 of the computer 201 reads information of the judgement file 1601 in the judgement area 321 of the storage 201, and generates the judgement file display screen (Step 1901).

The judgement display processing unit 310 of the computer 201 outputs the judgement file display screen 1801 to the output device (Step 1902).

According to the embodiment, the knowledge base for an AI tool is divided into the investigation KB and the attending matter KB, and an investigation method inference step and an attending matter inference step are executed. Therefore, the discretion of a user in determining the order of investigations is permitted by an investigation input step, while providing an investigation method conforming with rules.

Further, the knowledge base is divided into established rules and recommended rules. Therefore, a discretion of a user regarding the investigation method is permitted because the execution of a recommended rule can be avoided even if it is referred to, while providing an investigation conforming with established rules.

Furthermore, an investigation can be started from any one of investigation items displayed on the investigation item screen, without any limit of the order of selecting investigation items.

Further, intuitive evaluation knowledge of a user can be entered from the judgement display screen.

Still further, the criterion of an investigation selection method cab be inferred by using the investigation KB.

Still further, the criterion of the total judgement can be inferred by using the judgement KB.

According to the embodiment, it is possible to provide a just and fair judgement method while giving some discretion of a user, by allowing the user to enter some discretion via the investigation item selection screen, investigation screen, and judgement screen, and by enforcing the rules through inference by the investigation KB, attending matter KB, and judgement KB. Moreover, even a novice user can have a judgement method of a veteran user level.

The present invention has been described in detail, it should be understood that various changes, substitutions and alterations can be made hereto without departing from the spirit and scope of the present invention as defined by the appended claims.

What is claimed is:

1. A judgement support system comprising:

a display;

means for inputting a plurality of case attribute information;

a first knowledge base for storing a plurality of first IF-THEN rules, each including a first relationship between case attribute information in an IF part and an investigation item in a THEN part of one of said plurality of IF-THEN rules;

a display control circuit for controlling said display to display a plurality of investigation items;

a first identifying circuit for referring to each of said plurality of first IF-THEN rules to identify an identification item described in a THEN part as essential when one of said plurality of case attribute information meets a first predetermined condition described in a corresponding IF part and to identify an investigation item described in a THEN part as optional when one of said plurality of case attribute information does not meet any condition described in any corresponding IF part;

a memory for storing said identified optional and essential investigation items;

said display control circuit controlling said display to display a symbol thereby to discriminatively display an essential investigation item and an optional investigation item from each other;

means for enabling the user to select one of said optional and essential investigation items displayed on said display;

a second knowledge base for storing a plurality of second IF-THEN rules, each including a second relationship between said investigation items and case attribute information in an IF part and an attending matter in a THEN part, said attending matters being attended to by the user when said investigation item is investigated and including essential attending matters relative to which an investigation result is necessarily inputted and optional attending matters relative to which an input of an investigation result is optional;

a second identifying circuit for referring to each of said plurality of second IF-THEN rules to identify an essential attending matter described in a THEN part as essential when one of said investigation items and said case attribute information meets a condition described in a corresponding IF part and identify an optional attending matter described in a THEN part as optional when one of said investigation items and said case attribute information meets a condition described in a corresponding THEN part;

said display control circuit controlling said display to display said identified attending matter, said control circuit controlling said display to discriminatively display said essential attending matters and said optional attending matters;

means for enabling the user to input an investigation result in respect of said identified attending matter;

a third knowledge base for storing a plurality of third IF-THEN rules, each including a third relationship between said investigation result described in an IF part and an evaluation described in a THEN part;

a third identifying circuit for referring to each of said plurality of third IF-THEN rules to identify an inputted investigation result described in an IF part and said evaluation described in a THEN part;

said circuit controlling said display to display said identified evaluation;

an updating circuit for updating said investigation item stored in said memory when said identified evaluation includes updating said investigation item;

a judgement circuit for judging whether all essential investigation items among said investigation items stored in said memory have been investigated;

said display control circuit controlling said display to display an essential investigation item still not investigated, when said judgement circuit judges that said essential investigation item still not investigated remains; and a circuit for allowing the system to terminate the operation when said judgement circuit judges that said all essential investigation items have been investigated.

2. The system according to claim 1 further comprising:

said display control circuit for controlling said display to display said attending matter inputted with said investigation result and the evaluations for all selected investigation items.

3. The system according to claim 1 further comprising:

said display control circuit for controlling said investigation item to display a first identification symbol to said investigation item already investigated.

4. The system according to claim 3 wherein said display control circuit displays a second identification symbol in association with said essential investigation item and a third identification symbol in association with said optional investigation item to discriminate between said essential and optional investigation items.

5. The system according to claim 1 further comprising:

said display control circuit for controlling said display displaying said investigation item to display said evaluation identified by said third identifying circuit to said investigation item already investigated.

6. The system according to claim 5 wherein said display control circuit displays said evaluation with coloration.

7. The system according to claim 1 further comprising:

means for inputting basic data necessary for checking said attending matters;

a second memory for storing in advance a remark supplementing a check of said attending matter; and wherein said display control circuit controls said display displaying said attending matter to display said basic data and said remark at the same time when said attending matter is displayed.

8. The system according to claim 1 wherein said attending matter is displayed in the form of an inquiry to the user.

9. A judgement support system comprising:

a display;

means for inputting a plurality of case attribute information;

a first knowledge base for storing a plurality of first rules of IF-THEN statements, said first rules being used for obtaining investigation items from said case attribute information;

first inference means for inferring said investigation items by referring to each of said plurality of first rules of IF-THEN statements to display an investigation item described in a THEN part as essential when one of said plurality of case attribute information meets a first condition described in a corresponding IF part and to identify an investigation item described in a THEN part as optional when one of said plurality of case attribute information does not meet a condition described in any corresponding IF part;

storage means for storing said inferred essential and optional investigation items;

display control means for controlling said display to display said inferred essential and optional investigation items, said control means controlling said display to discriminatively display said essential and optional investigation items from each other;

means for allowing the user to select one of said optional and essential investigation items displayed on said display;

a second knowledge base for storing a plurality of second rules of if-then statements, said second rules being used for obtaining attending matters from said investigation items and said case attribute information, said attending matters being attended to by the user when said investigation items are investigated and including essential attending matters relative to which an investigation result is necessarily inputted and optional attending matters relative to which an input of an investigation result is optional;

second inference means for inferring at least one of said attending matters by referencing each of said plurality of second rules to identify an essential attending matter described in a second rule as essential when one of said investigation items and said case attribute information meets a condition described in said second rule and to identify an optional attending matter described in another second rule as not essential when one of said investigation items and said case attribute information do not meet a condition described in said another second rule;

said display control means controlling said display to display said one inferred attending matter and to discriminatively display said essential and optional attending matters for each other;

means for allowing the user to input an investigation result in respect of said one inferred attending matter;

a third knowledge base for storing a plurality of third rules of if-then statements, said third rules being used for obtaining an evaluation of said one selected investigation item from said investigation result;

third inference means for inferring said evaluation by referencing said inputted investigation result described in a one of said third rules;

said display control means controlling said display to display said inferred evaluation;

updating means for updating said inferred investigation items stored in said second means when said inferred evaluation includes updating said investigation items;

judgement means for judging whether all essential investigation items among said investigation items stored in said storage means have been investigated;

said display control means controlling said display to display an essential investigation item still not investigated when said judgement means judges that said essential investigation item still not investigated remains; and said display control means controlling said display to display said attending matter inputted with said investigation result and said evaluations of all selected investigation items, while allowing the system to thereafter terminate the operation when said judgement means judges that there is no remaining said essential investigation item still not investigated.

* * * * *